US010747955B2

(12) United States Patent
Mizobuchi

(10) Patent No.: US 10,747,955 B2
(45) Date of Patent: Aug. 18, 2020

(54) LEARNING DEVICE AND LEARNING METHOD

(71) Applicant: FUJITSU LIMITED, Kawasaki-shi, Kanagawa (JP)

(72) Inventor: Yuji Mizobuchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/919,811

(22) Filed: Mar. 13, 2018

(65) Prior Publication Data
US 2018/0285347 A1    Oct. 4, 2018

(30) Foreign Application Priority Data

Mar. 30, 2017    (JP) ................. 2017-068552

(51) Int. Cl.
*G06F 17/27* (2006.01)
*G06F 40/30* (2020.01)
(Continued)

(52) U.S. Cl.
CPC ............ *G06F 40/30* (2020.01); *G06F 16/355* (2019.01); *G06F 40/242* (2020.01);
(Continued)

(58) Field of Classification Search
CPC ...... G06F 16/35; G06F 16/353; G06F 16/355; G06F 16/36; G06F 16/367; G06F 16/374; G06F 16/285; G06F 16/288; G06F 16/45; G06F 16/65; G06F 16/75; G06F 16/906; G06F 17/30; G06F 16/903; G06F 17/2785; G06F 17/279; G06F 17/27;
(Continued)

(56) References Cited

U.S. PATENT DOCUMENTS 6,751,614 B1 *   6/2004   Rao ..................... G06F 16/355
9,672,279 B1 *   6/2017   Cohen ................. G06F 16/358
(Continued)

FOREIGN PATENT DOCUMENTS

EP   1 939 797 A1      7/2008
EP      1939797 A1 *   7/2008    ............. G06N 5/022
(Continued)

OTHER PUBLICATIONS

Tomas Mikolov et al., "Efficient Estimation of Word Representations in Vector Space", In Proceedings of workshop at ICLR, 2013, pp. 1-12.
(Continued)

*Primary Examiner* — Leshui Zhang
(74) *Attorney, Agent, or Firm* — Staas & Halsey LLP

(57) ABSTRACT

A learning device includes a memory and a processor configured to execute a process including acquiring a plurality of documents, clustering the plurality of documents with respect to each of a first plurality of words, the first plurality of words being included in the plurality of documents, assigning a common label to a first word and a second word among the first plurality of words in a case where a cluster relating to the first word and a cluster relating to the second word resemble each other, and re-clustering, on the basis of the common label, the plurality of documents including the first word and the second word after the assigning the common label.

13 Claims, 22 Drawing Sheets

(51) Int. Cl.
*G06N 20/00* (2019.01)
*G06N 5/02* (2006.01)
*G06F 16/35* (2019.01)
*G06F 40/242* (2020.01)
*G06F 40/247* (2020.01)
*G06F 40/284* (2020.01)
*G06F 40/289* (2020.01)

(52) U.S. Cl.
CPC .......... *G06F 40/247* (2020.01); *G06F 40/284* (2020.01); *G06F 40/289* (2020.01); *G06N 5/022* (2013.01); *G06N 20/00* (2019.01)

(58) Field of Classification Search
CPC ............... G06F 17/2735; G06F 17/274; G06F 17/2745; G06F 17/275; G06F 17/2755; G06F 17/276; G06F 17/2765; G06F 17/277; G06F 17/2775; G06F 17/278; G06F 17/2795
USPC ........ 704/1–10, 15.014, 238, 239, 240, 243, 704/245, 251, 252, 253, 254, 255, 256, 704/256.2, 256.3, 256.4, 256.5, 256.6, 704/256.7, 256.8, 257, 277, 278; 707/694, 693, 698, 737–750
See application file for complete search history.

(56) References Cited

U.S. PATENT DOCUMENTS

| | | | | |
|---|---|---|---|---|
| 9,805,115 B1* | 10/2017 | Satish | ................ | G06F 16/35 |
| 2002/0022956 A1* | 2/2002 | Ukrainczyk | .......... | G06F 17/218 |
| | | | | 704/9 |
| 2003/0130993 A1* | 7/2003 | Mendelevitch | ....... | G06F 16/353 |
| 2003/0177000 A1* | 9/2003 | Mao | ................ | G06F 17/2715 |
| | | | | 704/9 |
| 2004/0013302 A1* | 1/2004 | Ma | .................. | G06F 16/83 |
| | | | | 382/209 |
| 2004/0133560 A1* | 7/2004 | Simske | ............... | G06F 16/313 |
| 2004/0205081 A1* | 10/2004 | Chao | ................ | G06F 3/1208 |
| 2006/0101102 A1* | 5/2006 | Su | .................. | G06F 16/358 |
| 2007/0005337 A1* | 1/2007 | Mount | ................ | G06F 16/35 |
| | | | | 704/2 |
| 2008/0086433 A1* | 4/2008 | Schmidtler | ........... | G06N 20/00 |
| | | | | 706/12 |
| 2009/0094233 A1* | 4/2009 | Marvit | ................ | G06F 16/313 |
| 2009/0210406 A1* | 8/2009 | Freire | .................. | G06F 16/35 |
| 2011/0078191 A1* | 3/2011 | Ragnet | ............. | G06K 9/00879 |
| | | | | 707/780 |
| 2012/0124044 A1* | 5/2012 | Bhattacharya | .......... | G06F 16/35 |
| | | | | 707/737 |
| 2012/0310940 A1* | 12/2012 | Carmel | ................ | G06F 16/38 |
| | | | | 707/740 |
| 2015/0178345 A1* | 6/2015 | Carrier | .................. | G06F 17/28 |
| | | | | 707/691 |
| 2016/0217201 A1* | 7/2016 | Hummel | ............... | G06F 16/35 |
| 2016/0292157 A1* | 10/2016 | Zhang | ................ | G06F 16/3344 |
| 2016/0306812 A1* | 10/2016 | McHenry | .............. | G06Q 10/10 |
| 2017/0092265 A1* | 3/2017 | Sainath | .................. | G10L 15/16 |
| 2017/0177627 A1* | 6/2017 | Singh | .................. | G06F 16/353 |

FOREIGN PATENT DOCUMENTS

| | | |
|---|---|---|
| JP | 2005-92442 | 4/2005 |
| JP | 2008-171418 | 7/2008 |

OTHER PUBLICATIONS

Chang Xu et al. "RC-NET:A General Framework for Incorporating Knowledge into Word Representations", Proceeding of the 23rd ACM International Conference on Conference on Information and knowledge Management, ACM, 2014, pp. 1-10.

Yoshua Bengio et al. "A Neural Probabilistic Language Model", Journal of machine learning research, Feb. 3, 2003, pp. 1137-1155.

Jiang Guo et al. "Learning Sense-specific Word Embeddings by Exploiting Bilingual Resources", COLING, 2014, pp. 497-507.

* cited by examiner

FIG. 2

| DOCUMENT ID | DOCUMENT | ... |
|---|---|---|
| s1 | I wrote a memo in my notebook on the table. | |
| s2 | I switched off my notebook on the table. | |
| s3 | He created a table with my notebook. | |
| ... | | |
| s42 | I left a memo in my notebook on the desk. | |
| ... | | |
| s104 | I turned off my laptop on the table. | |
| ... | | |

FIG. 3

| SURFACE LAYER ID | WORD | ... |
|---|---|---|
| w1 | I | |
| w2 | wrote | |
| w3 | a | |
| w4 | memo | |
| w5 | in | |
| w6 | my | |
| w7 | notebook | |
| w8 | on | |
| w9 | the | |
| w10 | table | |
| w11 | switched | |
| w12 | off | |
| w13 | He | |
| w14 | created | |
| ... | | |
| w53 | desk | |
| ... | | |
| w78 | laptop | |
| ... | | |

FIG. 4A

| CONTEXT ID | CONTEXT | ... |
|---|---|---|
| c1 | (0,1,1,1,1,1,1,1,1,1,0,0,0,0···0,···0,···) | |
| c2 | (0,0,0,0,0,1,1,1,1,1,1,1,0,0...0,...0,...) | |
| c3 | N/A  1111 | |
| ... | | |
| c42 | (0,0,1,1,1,1,1,1,1,0,0,0,0,0···1,···0,···) | |
| ... | | |
| c104 | (0,0,0,0,0,1,0,1,1,1,0,1,0,0···0,···1,···) | |
| ... | | |

| CONTEXT ID | CONTEXT | ... |
|---|---|---|
| c1 | (1,0,1,1,1,1,1,1,1,1,0,0,0,0···0,···0,···) | |
| c2 | N/A | |
| c3 | N/A  1211 | |
| ... | | |
| c42 | N/A | |
| ... | | |
| c104 | N/A | |
| ... | | |

| CONTEXT ID | CONTEXT | ... |
|---|---|---|
| c1 | (1,1,1,1,1,1,0,1,1,1,0,0,0,0···0,···0,···) | |
| c2 | (1,0,0,0,0,1,0,1,1,1,1,1,0,0···0,···0,···) | |
| c3 | (0,0,1,0,0,1,0,1,1,1,0,0,1,1···0,···0,···) | |
| ... | ⌐1301 | |
| c42 | (1,0,1,1,1,1,0,1,1,0,0,0,0,0···1,···0,···) | |
| ... | | |
| c104 | N/A | |
| ... | | |

FIG. 4D

| CONTEXT ID | CONTEXT | ... |
|---|---|---|
| c1 | (1,1,1,1,1,1,1,1,1,0,0,0,0,0···0,···0,···) | |
| c2 | (1,0,0,0,0,1,1,1,1,0,1,1,0,0···0,···0,···) | |
| c3 | (0,0,1,0,0,1,0,1,1,0,0,0,1,1···0,···0,···) | |
| ... | ⌐1401 | |
| c42 | N/A | |
| ... | | |
| c104 | (1,0,0,0,0,1,0,1,1,0,0,1,0,0···0,···1,···) | |
| ... | | |

FIG. 4E

| CONTEXT ID | CONTEXT | 1501 | | ... |
|---|---|---|---|---|
| c1 | N/A | | | |
| c2 | N/A | | | |
| c3 | N/A | | | |
| ... | | | | |
| c42 | (1,0,1,1,1,1,1,1,1,0,0,0,0,0···0···0···) | | | |
| ... | | | | |
| c104 | N/A | | | |
| ... | | | | |

FIG. 4F

| CONTEXT ID | CONTEXT | 1601 | | ... |
|---|---|---|---|---|
| c1 | N/A | | | |
| c2 | N/A | | | |
| c3 | N/A | | | |
| ... | | | | |
| c42 | N/A | | | |
| ... | | | | |
| c104 | (1,0,0,0,0,1,0,1,1,1,0,1,0,0···0···0···) | | | |
| ... | | | | |

FIG. 5

| SURFACE LAYER ID | CLUSTER ID | CONTEXT ID | ... |
|---|---|---|---|
| w1 | cluster1 | c1,c2,c4,c5,···c42,···c104,··· | |
| ... | | | |
| w7 | cluster1 | c1,c2,c3,···c42,··· | ~2001 |
| ... | | | |
| w10 | cluster1 | c1,c2,c3,c7,c8,···c104,··· | ~2002 |
| ... | | | |
| w53 | cluster1 | c4,c5,···c42,··· | ~2101 |
| ... | | | |
| w78 | cluster1 | c7,c8,···c104,··· | ~2102 |
| ... | | | |
| ... | | | |

FIG. 6

| LABEL ID | SURFACE LAYER ID | WORD | ... |
|---|---|---|---|
| m1 | w1 | I | |
| m2 | w2 | wrote | |
| m3 | w3 | a | |
| m4 | w4 | memo | |
| m5 | w5 | in | |
| m6 | w6 | my | |
| m7 | w7 | notebook | |
| m7 | w78 | laptop | |
| m8 | w8 | on | |
| m9 | w9 | the | |
| m10 | w10 | table | |
| m10 | w53 | desk | |
| m11 | w11 | switched | |
| m12 | w12 | off | |
| m13 | w13 | He | |
| m14 | w14 | created | |
| ... | ... | | |

3001 (m7 rows)
3002 (m10 rows)

FIG. 7

| CONTEXT ID | CONTEXT | ... |
|---|---|---|
| c1 | (1,1,1,1,1,1,0,1,1,0,0,0,0,0···) | |
| c2 | (1,0,0,0,0,1,0,1,1,0,1,1,0,0···) | |
| c3 | (0,0,1,0,0,1,0,1,1,0,0,0,1,1···) | |
| ... | | |
| c42 | (1,0,1,1,1,1,0,1,1,1,0,0,0,0···) | |
| ... | | |
| c104 | (1,0,0,0,0,1,0,1,1,0,0,1,0,0···) | |
| ... | | |

| LABEL ID | CLUSTER ID | CONTEXT ID | ... |
|---|---|---|---|
| m1 | cluster1 | c1,c2,c4,c5,···c42,···c104,··· | |
| ... | | | |
| m7 | cluster1 | c1,c2,c3,c7,c8,···c42,···c104,··· | ~ 4001 |
| ... | | | |
| m10 | cluster1 | c1,c2,c3,c4,c5,c7,c8,···c42,···c104,··· | ~ 4002 |
| ... | | | |

FIG. 10

CLUSTERED AS FOLLOWS m1(I):c1,c2,c4,c5,···c42,···c104,···

...

m7(notebook,laptop):c1,c2,c3,c7,c8,···c42,···c104,···

...

m10(table,desk):c1,c2,c3,c4,c5,c7,c8,···c42,···c104,···

FIG. 12

| SURFACE LAYER ID | CLUSTER ID | CONTEXT ID | ... |
|---|---|---|---|
| w1 | cluster1 | c1,c2,c4,c5,... | |
| ... | | | |
| w7 | cluster1 | c1,...c42,... | |
| w7 | cluster2 | c2,c3,... | ~5001 |
| ... | | | |
| w10 | cluster1 | c1,c2,c8,...c104,... | |
| w10 | cluster2 | c3,c7,... | ~5002 |
| ... | | | |
| w53 | cluster1 | c4,c5,...c42,... | |
| ... | | | |
| w78 | cluster1 | c7,c8,...c104,... | |
| ... | | | |

FIG. 16

| LABEL ID | SURFACE LAYER ID | ... |
|---|---|---|
| ... | | |
| m15 | w14,w23,... | |
| ... | | |
| m21 | w31,w42,... | |
| ... | | |

LEARNING DEVICE AND LEARNING METHOD

CROSS-REFERENCE TO RELATED APPLICATION

This application is based upon and claims the benefit of priority of the prior Japanese Patent Application No. 2017-68552, filed on Mar. 30, 2017, the entire contents of which are incorporated herein by reference.

FIELD

The embodiments discussed herein are related to a learning technique.

BACKGROUND

In terms of sentence processing, there is known a technique for obtaining an expression of a word by using a vector of words co-occurring (appearing simultaneously) in a sentence. For example, the technique for preparing a cluster map by arranging clusters on a two-dimensional plane is known. This technique uses terminal equipment for a user which inputs a retrieval sentence or outputs a retrieval result, a retrieval device which performs retrieval processing of a patent document based on the retrieval sentence, and terminal equipment for management which registers the patent document in the retrieval device. In this technique, a large amount of technical documents (patent documents or the like) are efficiently classified into clusters on several multi-dimensional spaces, and those clusters are arranged on a two-dimensional plane so as to prepare a cluster map.

There is also known a technique for automatically determining semantic classification of context data obtained by a mobile device. In this technique, one or more context data streams are sampled with time, and a clustering algorithm is applied so as to identify one or more clusters in the sampled context data. Further, in this technique, a logic engine is run to automatically determine a concept name from a set of predefined concept names as a semantic classification of the one or more clusters, and the concept name is assigned to the one or more clusters or the assignment is suggested to the user.

Related arts are disclosed in Japanese Laid-open Patent Publication No. 2005-092442, Japanese Laid-open Patent Publication No. 2008-171418, Tomas Mikolov, Kai Chen, Greg Corrado, and Jeffrey Dean, "Efficient Estimation of Word Representations in Vector Space." *Proceedings of Workshop at ICLR,* 2013, Xu Chang et al., "RC-NET: A General Framework for Incorporating Knowledge into Word Representations." *Proceeding of the 23rd ACM International Conference on Conference on Information and Knowledge Management, ACM,* 2014, Bengio, Yoshua, et al., "A Neural Probabilistic Language Model." *Journal of Machine Learning Research,* 3. February, 1137-1155, 2003, and Guo, Jiang, et al., "Learning Sense-specific Word Embeddings By Exploiting Bilingual Resources." *COLING,* 2014, for example.

SUMMARY

According to an aspect of the invention, a learning device includes a memory and a processor configured to execute a process including acquiring a plurality of documents, clustering the plurality of documents with respect to each of a first plurality of words, the first plurality of words being included in the plurality of documents, assigning a common label to a first word and a second word among the first plurality of words in a case where a cluster relating to the first word and a cluster relating to the second word resemble each other, and re-clustering, on the basis of the common label, the plurality of documents including the first word and the second word after the assigning the common label.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a drawing illustrating an example of a learning corpus according to the first embodiment;

FIG. 3 is a drawing illustrating an example of a surface layer word dictionary according to the first embodiment;

FIG. 4A is a diagram illustrating an example of a context storage unit according to the first embodiment;

FIG. 4B is a diagram illustrating another example of the context storage unit according to the first embodiment;

FIG. 4C is a diagram illustrating still another example of the context storage unit according to the first embodiment;

FIG. 4D is a diagram illustrating yet another example of the context storage unit according to the first embodiment;

FIG. 4E is a diagram illustrating yet another example of the context storage unit according to the first embodiment;

FIG. 4F is a diagram illustrating yet another example of the context storage unit according to the first embodiment;

FIG. 5 is a diagram illustrating an example of a cluster storage unit according to the first embodiment;

FIG. 6 is a diagram illustrating an example of a semantic label storage unit according to the first embodiment;

FIG. 7 is a diagram illustrating an example of the context storage unit after updating according to the first embodiment;

FIG. 8 is a diagram illustrating an example of the cluster storage unit after updating according to the first embodiment;

FIG. 10 is a diagram illustrating an example of a clustering output result according to the first embodiment;

FIG. 12 is a diagram illustrating an example of a cluster storage unit before label assignment according to a second embodiment;

FIG. 16 is a diagram illustrating an example of a word meaning dictionary according to the third embodiment;

DESCRIPTION OF EMBODIMENTS

In conventional technology, there is a problem that accuracy in distributed learning is degraded when the number of input documents is small. Especially, when a concept name is automatically determined as a semantic classification of one or more clusters, words are subdivided by concept name, lowering the number of inputted documents including this concept name. Thus, accuracy in distributed learning is easily degraded.

A learning device, a learning method, and a learning program according to embodiments of the present disclosure will be detailed below with reference to the accompanying drawings. However, the embodiments do not limit the present disclosure. Further, the embodiments described below may be combined as appropriate without causing contradictions.

The following embodiments provide descriptions of distributed learning for English documents which include each of "notebook" and "laptop", each of which has a meaning of "a portable computer", and "table" and "desk", each of which has a meaning of "a piece of furniture consisting of a smooth flat slab fixed on legs". Here, the embodiments may discuss distributed learning for documents of another language such as Japanese and Chinese as well as the distributed learning for English documents.

First Embodiment

[Functional Block]

Figure 1:
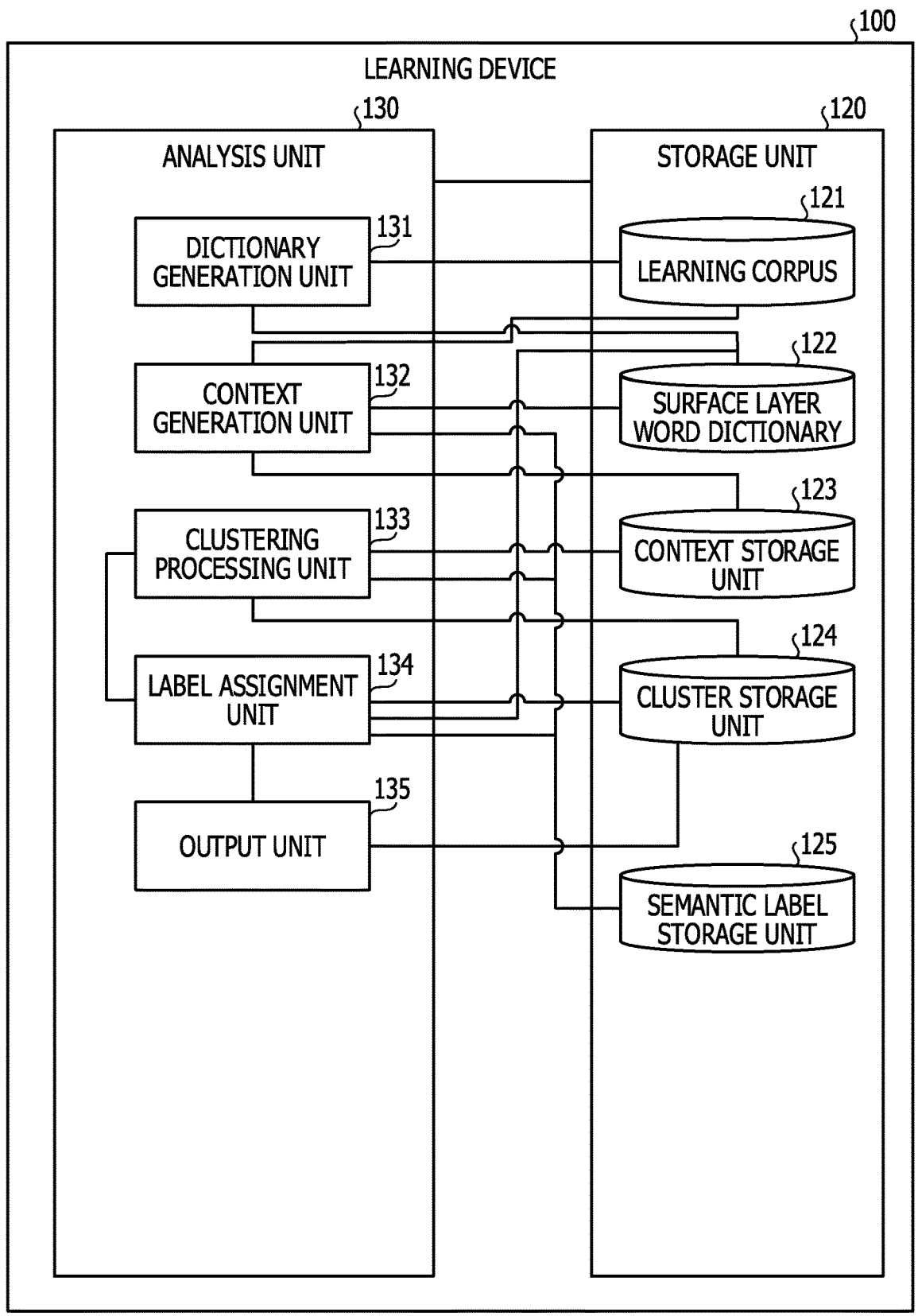
FIG. 1 is a drawing illustrating an example of a learning device according to a first embodiment.

An example of a learning device according to the present embodiment will be described with reference to FIG. 1. FIG. 1 is a drawing illustrating an example of a learning device according to the first embodiment. As illustrated in FIG. 1, a learning device 100 according to the present embodiment includes a storage unit 120 and an analysis unit 130.

The storage unit 120 stores various data such as a program executed by the analysis unit 130, for example. Further, the storage unit 120 includes a learning corpus 121, a surface layer word dictionary 122, a context storage unit 123, a cluster storage unit 124, and a semantic label storage unit 125. The storage unit 120 corresponds to a semiconductor memory device such as a random access memory (RAM), a read only memory (ROM), and a flash memory, or a storage device such as a hard disk drive (HDD).

The learning corpus 121 is a corpus used for learning. Here, the corpus represents a collection of sentences. FIG. 2 is a drawing illustrating an example of the learning corpus according to the first embodiment. As illustrated in FIG. 2, the learning corpus 121 stores a plurality of "documents" in association with "document IDs" (identifiers) which are identifiers for uniquely identifying the documents. The learning corpus 121 stores a document "I wrote a memo in my notebook on the table." in association with the document ID "s1", for example. Here, information which is acquired via a communication unit which is not illustrated, for example, is preliminarily stored in the learning corpus 121. Further, a "document" in the present embodiment is one sentence, for example, as illustrated in FIG. 2, but is not limited to this. A "document" may be a document including a plurality of sentences.

The surface layer word dictionary 122 stores a surface layer of a word extracted from a document stored in the learning corpus 121. Here, when notation of a word is described without considering a meaning of the word, an expression "surface layer" may be used below.

FIG. 3 is a drawing illustrating an example of a surface layer word dictionary according to the first embodiment. As illustrated in FIG. 3, the surface layer word dictionary 122 stores words included in the document of the document ID "s1" of the learning corpus 121, for example, in association with surface layer IDs "w1" to "w10" respectively which are identifiers for uniquely identifying a surface layer of a word. In a similar manner, the surface layer word dictionary 122 stores unregistered words "switched" and "off" among words included in the document of the document ID "s2" of the learning corpus 121 in association with surface layer IDs "w11" and "w12" respectively. In a similar manner, the surface layer word dictionary 122 stores an unregistered word "desk" among words included in the document of the document ID "s42" and an unregistered word "laptop" among words included in the document of the document ID "s104" in association with surface layer IDs "w53" and "w78" respectively. Here, information stored in the surface layer word dictionary 122 is inputted by a dictionary generation unit 131 which will be described later. Further, the surface layer word dictionary 122 may be configured to store a phrase composed of a plurality of words, for example, as well as a single word in association with a surface layer ID.

The context storage unit 123 stores a context represented by a vector of words co-occurring in a sentence (bag of words) in the sentence appearing in a corpus. A context in the present embodiment is generated for each document ID stored in the learning corpus 121. Further, a context in the present embodiment is individually generated for each word desired to be estimated even with respect to one document. Therefore, the context storage unit 123 in the present embodiment has one table for each word stored in the surface layer word dictionary 122. Here, information stored in the context storage unit 123 is inputted by a context generation unit 132 which will be described later.

Information stored in the context storage unit 123 according to the present embodiment will be described with reference to FIGS. 4A to 4F. FIG. 4A is a diagram illustrating an example of the context storage unit according to the first embodiment. FIG. 4A illustrates a table storing contexts of a word "I" of the surface layer ID "w1" stored in the surface layer word dictionary 122. As illustrated in FIG. 4A, the context storage unit 123 stores a "context" in association with a "context ID" which is an identifier for uniquely identifying a context. Here, a context ID corresponds to a document ID stored in the learning corpus 121 one on one. That is, the context ID "c1" illustrated in FIG. 4A represents a context, which is generated with respect to the word "w1" desired to be estimated, of the document of the document ID "s1" illustrated in FIG. 2. In a similar manner, the context ID "cn" illustrated in FIG. 4A represents a context, which is generated with respect to the word "w1" desired to be estimated, of a document of the document ID "sn" illustrated in FIG. 2.

A context in the present embodiment is expressed in a form of a vector in which a word which appears in a document is denoted by 1 and a word which does not appear in the document is denoted by 0, as illustrated in FIG. 4A. In FIG. 4A, the first term of a vector represents whether or not the word of the surface layer ID "w1" of the surface layer word dictionary 122 appears. In a similar manner, the n-th term of a vector illustrated in FIG. 4A represents whether or not the word of the surface layer ID "wn" of the surface layer word dictionary 122 appears. However, in a context in the present embodiment, a value of a term representing a word desired to be estimated is denoted by "0" invariably. Since FIG. 4A illustrates the context of the surface layer ID "w1", a value of the first term of each context is "0" on a consistent basis as denoted by the reference numeral 1101 of FIG. 4A. Further, since the word "I" does not appear in the document of the document ID "s3" corresponding to the context ID "c3", the context of the context ID "c3" is "N/A" (not applicable) as denoted by the reference numeral 1111 of FIG. 4A.

Contents of the context storage unit 123 corresponding to other words will now be described. FIGS. 4B to 4F are diagrams illustrating other examples of the context storage unit according to the first embodiment. Since FIG. 4B illustrates a table which stores contexts of the word "wrote" of the surface layer ID "w2" stored in the surface layer word dictionary 122, the value of the second term of each context is "0" invariably, as denoted by the reference numeral 1201 of FIG. 4B. Further, the word "wrote" does not appear in any of documents corresponding to the context IDs "c2", "c3", "c42", and "c104". Therefore, the table illustrated in FIG. 4B stores contexts 1211 of the context IDs "c2", "c3", "c42", and "c104" as "N/A".

Further, since FIG. 4C illustrates a table which stores contexts of the word "notebook" of the surface layer ID "w7" stored in the surface layer word dictionary 122, the value of the seventh term of each context is "0" invariably, as denoted by the reference numeral 1301 of FIG. 4C. Furthermore, since the word "notebook" does not appear in a document corresponding to the context ID "c104", the table illustrated in FIG. 4C stores the context corresponding to the context ID "c104" as "N/A".

In a similar manner, since FIG. 4D illustrates a table which stores contexts of the word "table" of the surface layer ID "w10" stored in the surface layer word dictionary 122, the value of the tenth term of each context is "0" invariably, as denoted by the reference numeral 1401 of FIG. 4D. Further, since the word "table" does not appear in a document corresponding to the context ID "c42", the table illustrated in FIG. 4D stores the context corresponding to the context ID "c42" as "N/A".

Further, since FIG. 4E illustrates a table which stores contexts of the word "desk" of the surface layer ID "w53" stored in the surface layer word dictionary 122, the value of the 53rd term of each context is "0" invariably, as denoted by the reference numeral 1501 of FIG. 4E. The word "desk" does not appear in any of documents corresponding to the context IDs "c1", "c2", "c3", and "c104". Therefore, the table illustrated in FIG. 4E stores the contexts corresponding to the context IDs "c1", "c2", "c3", and "c104" as "N/A". In a similar manner, since FIG. 4F illustrates a table which stores contexts of the word "laptop" of the surface layer ID "w78" stored in the surface layer word dictionary 122, the value of the 78th term of each context is "0" invariably, as denoted by the reference numeral 1601 of FIG. 4F. The word "laptop" does not appear in any of documents corresponding to the context IDs "c1", "c2", "c3", and "c42". Therefore, the table illustrated in FIG. 4F stores the contexts corresponding to the context IDs "c1", "c2", "c3", and "c42" as "N/A".

The cluster storage unit 124 stores a result obtained by clustering contexts stored in the context storage unit 123. Here, information stored in the cluster storage unit 124 is inputted or updated by a clustering processing unit 133 which will be described later.

The cluster storage unit 124 stores a cluster specified through clustering processing and including contexts, in which a concerned word desired to be estimated appears, for each word desired to be estimated, as illustrated in FIG. 5. FIG. 5 is a diagram illustrating an example of the cluster storage unit according to the first embodiment. As denoted by the reference numerals 2001 to 2102 in FIG. 5, the cluster storage unit 124 stores "cluster ID" and "context ID" in association with "surface layer ID".

In FIG. 5, "cluster ID" is an identifier for uniquely identifying a cluster including a word desired to be estimated. Here, since a word of any surface layer ID is related to only one cluster, every cluster ID becomes "cluster1" in the present embodiment.

The semantic label storage unit 125 stores a semantic label assigned to each word stored in the surface layer word dictionary 122. Here, information stored in the semantic label storage unit 125 is inputted by a label assignment unit 134 which will be described later. FIG. 6 is a diagram illustrating an example of the semantic label storage unit according to the first embodiment. The semantic label storage unit 125 stores "surface layer ID" and "word" in association with "label ID" as illustrated in FIG. 6.

In FIG. 6, "label ID" is an identifier for uniquely identifying a semantic label assigned to a word of each surface layer ID. Here, in the present embodiment, there is the case where a plurality of surface layer IDs are associated with one label ID and stored as denoted by the reference numerals 3001 and 3002 of FIG. 6. For example, the word "notebook" of the surface layer ID "w7" and the word "laptop" of the surface layer ID "w78" are stored in association with the label ID "m7". In a similar manner, the word "table" of the surface layer ID "w10" and the word "desk" of the surface layer ID "w53" are stored in association with the label ID "m10".

The analysis unit 130 is a processing unit which controls the overall processing of the learning device 100. The analysis unit 130 is realized, for example, when a central processing unit (CPU), a micro processing unit (MPU), or the like executes a program stored in an internal storage device on a RAM used as a work area. Further, the analysis unit 130 may be realized, for example, by an integrated circuit such as an application specific integrated circuit (ASIC) and a field programmable gate array (FPGA). This analysis unit 130 includes the dictionary generation unit 131, the context generation unit 132, the clustering processing unit 133, the label assignment unit 134, and an output unit 135. Here, the dictionary generation unit 131, the context generation unit 132, the clustering processing unit 133, the label assignment unit 134, and the output unit 135 are examples of electronic circuits included in a processor or examples of processes executed by the processor.

The dictionary generation unit 131 reads a document from the learning corpus 121 and extracts words from the document. The dictionary generation unit 131 extracts words from the document by using the known morpheme analysis technology, word segmentation technology, or the like, for example. Further, the dictionary generation unit 131 assigns surface layer IDs to the extracted words and stores the extracted words in the surface layer word dictionary 122, as illustrated in FIG. 3.

The context generation unit 132 generates contexts from each document stored in the learning corpus 121 for each word stored in the surface layer word dictionary 122, assigns context IDs to the generated contexts, and stores the contexts in the context storage unit 123 as illustrated in FIGS. 4A to 4F, for example.

The context generation unit 132 generates a context of which all terms are "0", for example, in association with a document of a specific document ID stored in the learning corpus 121. Then, the context generation unit 132 specifies any surface layer ID stored in the surface layer word dictionary 122.

Next, the context generation unit 132 determines whether or not a word of each surface layer ID stored in the surface layer word dictionary 122 other than the specified surface layer ID is included in each document including the word of the concerned surface layer ID and stored in the learning corpus 121. When the context generation unit 132 determines that the word is included in the concerned document, the context generation unit 132 sets a value of a term of a context corresponding to the surface layer ID of the concerned word to "1". Then, the context generation unit 132 repeats the processing for words, which are included in the surface layer word dictionary 122, of all surface layer IDs other than the specified surface layer ID so as to generate a context with respect to the document of the specified document ID. The context generation unit 132 repeats generation of a context for documents corresponding to all documents ID and including the word of the concerned surface layer ID so as to store the contexts as those illustrated in FIGS. 4A to 4F in the context storage unit 123.

Further, the context generation unit 132 updates the generated contexts for each semantic label stored in the semantic label storage unit 125 so as to store the updated contexts in the context storage unit 123. FIG. 7 is a diagram illustrating an example of the context storage unit after updating according to the first embodiment. FIG. 7 illustrates contexts for the words "table" and "desk" to which the label ID "m10" is assigned.

For example, the context of the context ID "c42" is "N/A" in FIG. 4D, but a new context is stored as denoted by the reference numeral 1901 in FIG. 7. This is because the word "desk" assigned with the label ID "m10" is included in the document of the document ID "s42" corresponding to the context of the context ID "c42" though the word "table" also assigned with the label ID "m10" is not included.

Further, the seventh term in the context of the context ID "c104" is "0" in FIG. 4D, but the seventh term is updated to "1" as denoted by the reference numeral 1911. This is because the word "laptop" assigned with the label ID "m7" is included in the document of the document ID "s104" corresponding to the context of the context ID "c104" though the word "notebook" also assigned with the label ID "m7" is not included.

The clustering processing unit 133 classifies contexts stored in the context storage unit 123 into clusters. The clustering processing unit 133 calculates distances among contexts with the known clustering technique, for example, so as to set a group of contexts whose distance is short as one cluster. Then, the clustering processing unit 133 stores clustering processing results as those illustrated in FIG. 5 in the cluster storage unit 124.

Further, the clustering processing unit 133 classifies contexts updated by using semantic labels into clusters so as to update clusters stored in the cluster storage unit 124. FIG. 8 is a diagram illustrating an example of the cluster storage unit after updating according to the first embodiment. As illustrated in FIG. 8, the cluster storage unit 124 after updating stores "label ID" instead of "surface layer ID" illustrated in FIG. 5.

For example, the cluster storage unit 124 after updating includes the contexts corresponding to the surface layer ID "w7" and the contexts corresponding to the surface layer ID "w78" illustrated in FIG. 5 as contexts corresponding to the label ID "m7" as denoted by the reference numeral 4001 of FIG. 8. That is, the cluster storage unit 124 after updating includes the contexts of the context IDs "c1" and "c42" corresponding to the surface layer ID "w7" and the contexts of the context IDs "c7", "c8", and "c104" corresponding to the surface layer ID "w78". In a similar manner, the cluster storage unit 124 after updating includes the contexts corresponding to the surface layer ID "w10" and the contexts corresponding to the surface layer ID "w53" as contexts corresponding to the label ID "m10" as denoted by the reference numeral 4002 of FIG. 8, for example. That is, more input documents than input documents assigned to the surface layer ID "w7" are assigned to the label ID "m7" in the present embodiment.

The label assignment unit 134 refers to the cluster storage unit 124 so as to assign a semantic label to words which have been used for classification to respective clusters. In the present embodiment, the label assignment unit 134 specifies clusters, which are similar to each other, and assigns a common semantic label to words of respective surface layer IDs which have been used for classification to respective clusters, as denoted by the reference numerals 3001 and 3002 of FIG. 6, for example.

The label assignment unit 134 determines whether or not a distance between centers of gravity of two clusters, for example, is smaller than a predetermined threshold value so as to determine whether or not the clusters are similar to each other. The predetermined threshold value is preliminarily stored in the storage unit 120, for example.

Figure 9:
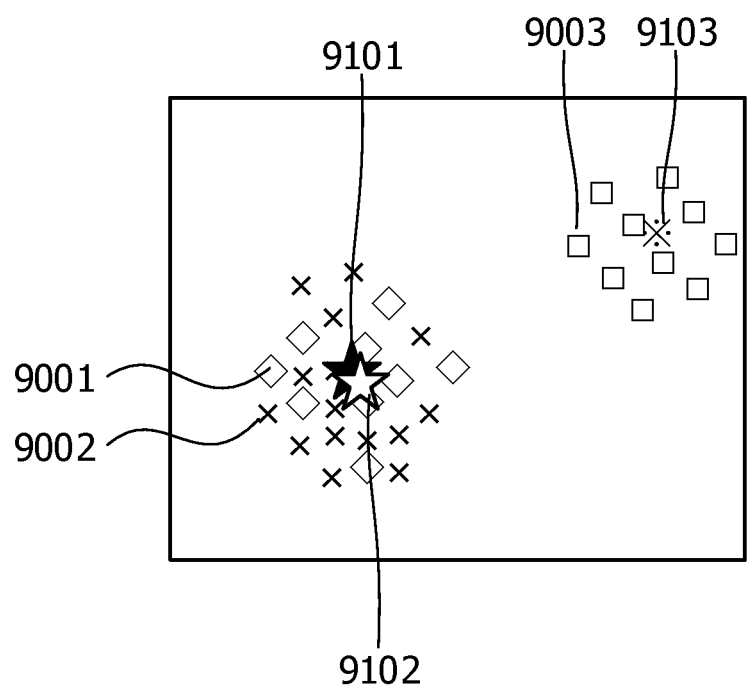
FIG. 9 is a diagram illustrating an example of a clustering result according to the first embodiment.

The processing for determining whether or not clusters are similar to each other by the label assignment unit 134 will be described with reference to FIG. 9. FIG. 9 is a diagram illustrating an example of a clustering result according to the first embodiment. In FIG. 9, the symbol "◇" 9001 denotes distribution of contexts including the word "table" and the symbol "x" 9002 denotes distribution of contexts including the word "desk". Further, the symbol "★" 9101 denotes a center of gravity of the distribution of contexts including the word "table" and the outlined star 9102 denotes a center of gravity of the distribution of contexts including the word "desk". In a similar manner, the symbols "□" 9003 and "∗" 9103 respectively denotes distribution of contexts including the word "laptop" and a center of gravity of the distribution of contexts including the word "laptop".

As illustrated in FIG. 9, the distribution of contexts including the word "table" of the surface layer ID "w10" and the distribution of contexts including the word "desk" of the surface layer ID "w53" approximate each other and the distance between the centers of gravity of these distribution of contexts is short. In such case, the label assignment unit 134 determines that the cluster of contexts including the word "table" and the cluster of contexts including the word "desk" are similar to each other and assigns the common label ID "m10" to the words "table" and "desk".

On the other hand, since the distance between the center of gravity of the distribution of contexts including the word "table" and the center of gravity of the distribution of contexts including the word "laptop" of the surface layer ID "w78" is larger than the threshold value, the label assignment unit 134 does not assign the label ID "m10", which is common to that of "table", to the word "laptop".

Further, the label assignment unit 134 may determine whether or not clusters are similar to each other depending on whether or not a difference in distribution of two clusters is equal to smaller than a predetermined threshold value, for example, instead of depending on the distance between centers of gravity of two clusters.

Referring back to FIG. 1, the output unit 135 refers to the cluster storage unit 124 so as to output a result of the clustering processing. FIG. 10 is a diagram illustrating an example of a clustering output result according to the first embodiment. As illustrated in FIG. 10, the output unit 135 enumerates contexts included in a cluster for each assigned label, as a result of the clustering processing. That is, the output unit 135 integrates the words "notebook" and "laptop" assigned with the label "m7" into one cluster and integrates the words "table" and "desk" assigned with the label "m10" into one cluster so as to enumerate the contexts included in each cluster.

[Processing Flow]

Figure 11:
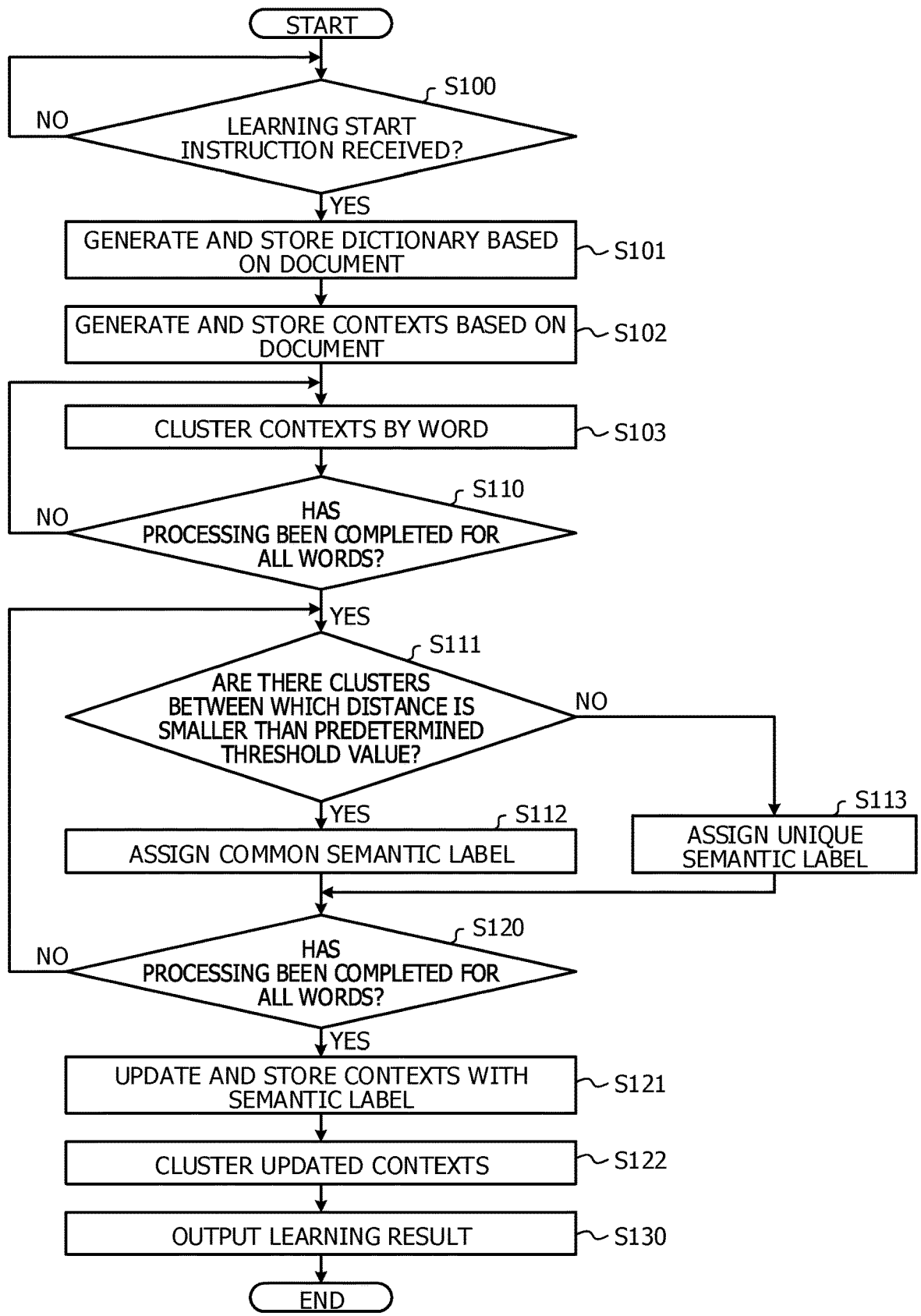
FIG. 11 is a flowchart illustrating an example of learning processing according to the first embodiment.

Learning processing performed by the learning device 100 according to the present embodiment will now be described with reference to FIG. 11. FIG. 11 is a flowchart illustrating an example of the learning processing according to the first embodiment. As illustrated in FIG. 11, the dictionary generation unit 131 of the learning device 100 stands by (S100: No) until receiving a learning start instruction from a user, who is not illustrated, through an operation unit, which is not illustrated, for example. When the dictionary generation unit 131 determines that the dictionary generation unit 131 has received the learning start instruction (S100: Yes), the dictionary generation unit 131 acquires a document from the learning corpus 121 and extracts words so as to store the extracted words in the surface layer word dictionary 122 (S101).

Then, the context generation unit 132 refers to the learning corpus 121 and the surface layer word dictionary 122 so as to generate contexts corresponding to the document and store the contexts in the context storage unit 123 (S102). Next, the clustering processing unit 133 clusters the contexts stored in the context storage unit 123 by word stored in the surface layer word dictionary 122 (S103). The clustering processing unit 133 returns to S103 and repeats the clustering processing until the processing is completed for all words stored in the surface layer word dictionary 122 (S110: No).

Then, when the clustering processing is completed for all words stored in the surface layer word dictionary 122 (S110: Yes), the label assignment unit 134 determines whether or not there are generated clusters between which a distance is smaller than a predetermined threshold value (S111). When the label assignment unit 134 determines that there are clusters between which a distance is smaller than the predetermined threshold value (S111: Yes), the label assignment unit 134 assigns a common semantic label to each word used for classification to the clusters (S112) and the processing goes to S120. On the other hand, when the label assignment unit 134 determines that there are no clusters between which a distance is smaller than the predetermined threshold value (S111: No), the label assignment unit 134 assigns a unique semantic label to the word used for classification to clusters (S113) and the processing goes to S120.

The label assignment unit 134 returns to S111 and repeats the processing until the processing is completed for all clusters stored in the cluster storage unit 124 (S120: No). When the processing is completed for all clusters stored in the cluster storage unit 124 (S120: Yes), the context generation unit 132 updates the contexts with the assigned label (S121).

Next, the clustering processing unit 133 classifies the updated contexts into clusters and stores the classified clusters in the cluster storage unit 124 (S122). Then, the output unit 135 refers to the cluster storage unit 124 and outputs a result screen as that illustrated in FIG. 10 (S130), and the processing is ended.

Advantageous Effects

As described above, when the learning device according to the present embodiment classifies a plurality of documents into clusters by using words included in the plurality of documents, the learning device assigns a label to each word used in the classification to the clusters and classifies the plurality of documents into the clusters by using the label assigned to each word. Further, when a cluster obtained through classification with a first word and a cluster obtained through classification with a second word are similar to each other, the learning device according to the present embodiment assigns a label, which is common to a label assigned to the first word, to the second word. Accordingly, it is possible to ensure the number of input documents used for distributed learning even in the case where the number of input documents is small.

Further, when the learning device according to the present embodiment determines that a distance between centers of gravity of a plurality of clusters is smaller than a first threshold value, or when the learning device determines that a difference in distribution of a plurality of clusters is smaller than a second threshold value, the learning device determines that the plurality of clusters are similar to each other. This enables easy determination of whether or not there are words which have similar meanings and have different surface layers.

Second Embodiment

There is the case where words having the same surface layers have different meanings, for example. There is the case where documents including words of one surface layer are classified into a plurality of clusters, for example. In such case, documents including the word tend to be subdivided and the number of input documents tends to decrease. Therefore, a common label is assigned to a word of each subdivided surface layer and a word having a meaning similar to that of the subdivided word in the configuration in which words having the same surface layers are subdivided, effectively increasing the number of input documents used for distributed learning.

[Functional Block]

An example of a learning device according to the present embodiment will be described. Here, in the following embodiment, the same parts as those illustrated in the drawings described above are denoted by the same reference numerals and redundant description will be omitted. Further, illustration of the learning device according to the present embodiment will be omitted.

A learning device 200 according to the present embodiment includes a storage unit 220 and an analysis unit 230. The storage unit 220 includes the learning corpus 121, the surface layer word dictionary 122, the context storage unit 123, the cluster storage unit 124, and a semantic label storage unit 225.

Though the semantic label storage unit 225 stores a semantic label assigned to each word stored in the surface layer word dictionary 122 as is the case with the semantic label storage unit 125, the semantic label storage unit 225 is different from the semantic label storage unit 125 in that the semantic label storage unit 225 sometimes stores one surface layer ID in association with a plurality of label IDs. Here, information stored in the semantic label storage unit 225 is inputted by a label assignment unit 234 which will be described later.

For example, the semantic label storage unit 225 stores the word "notebook" of the surface layer ID "w7" having a meaning of "a small book with blank or ruled pages for writing notes in" and a meaning of "a portable computer" in association with two label IDs which are "m7_1" and "m7_2". Further, the semantic label storage unit 225 stores the word "laptop" of the surface layer ID "w78" having a meaning of "a portable computer" as the word "notebook" in association with the label ID "m7_2" which is associated with "notebook".

This analysis unit 230 includes the dictionary generation unit 131, the context generation unit 132, the clustering processing unit 133, the label assignment unit 234, and the output unit 135. Here, the label assignment unit 234 is also an example of an electronic circuit included in a processor or an example of a process executed by the processor.

The label assignment unit 234 refers to the cluster storage unit 124 so as to assign a semantic label to each word used for classification to clusters as is the case with the label assignment unit 134. In the present embodiment, the label assignment unit 234 specifies clusters which are similar to each other and assigns a common semantic label to words of respective surface layer IDs used for classification to these clusters.

Further, the label assignment unit 234 according to the present embodiment determines whether or not distribution of documents including a word of a specific surface layer ID includes two or more clusters. When the label assignment unit 234 determines that the distribution of documents includes two or more clusters, the label assignment unit 234 assigns different label IDs respectively to the surface layer IDs belonging to respective clusters. When distribution of documents including the word "notebook" of the surface layer ID "w7" includes two clusters, for example, the label assignment unit 234 assigns different label IDs respectively to the surface layer IDs "w7" belonging to these clusters. Then, the label assignment unit 234 stores different label IDs "m7_1" and "m7_2" in the semantic label storage unit 225 in association with the surface layer IDs "w7".

In addition, as is the case with "notebook", the label assignment unit 234 assigns the label ID "m7_2", which is assigned to "notebook", also to the word "laptop" of the surface layer ID "w78" having the meaning of "a portable computer". On the other hand, since the word "laptop" does not have the meaning of "a small book with blank or ruled pages for writing notes in", the label assignment unit 234 does not assign the label ID "m7_1", which is assigned to "notebook", to the word "laptop".

Figure 13:
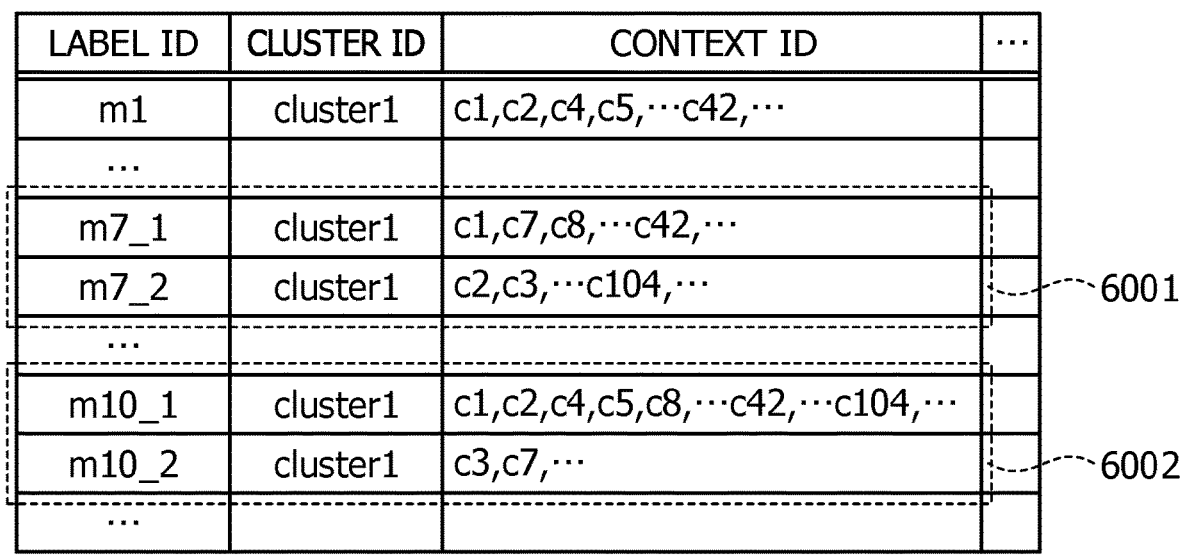
FIG. 13 is a diagram illustrating an example of a cluster storage unit after label assignment according to the second embodiment.

An example of the cluster storage unit which is updated with a label assigned by the label assignment unit 234 will be described with reference to FIGS. 12 and 13. FIG. 12 is a diagram illustrating an example of the cluster storage unit before label assignment according to the second embodiment. The reference numeral 5001 of FIG. 12 represents that distribution of documents including the word "notebook" of the surface layer ID "w7" includes two clusters of cluster IDs "cluster1" and "cluster2". In a similar manner, the reference numeral 5002 of FIG. 12 represents that distribution of documents including the word "table" of the surface layer ID "w10" includes two clusters of cluster IDs "cluster1" and "cluster2".

In this case, the label assignment unit 234 stores the two label IDs "m7_1" and "m7_2" in the semantic label storage unit 225 in association with the surface layer ID "w7".

Further, the label assignment unit 234 stores the label ID "m7_2" in the semantic label storage unit 225 in association with the word "laptop" of the surface layer ID "w78", as well. In a similar manner, the label assignment unit 234 stores the label ID "m10_1" in the semantic label storage unit 225 in association with the word "desk" of the surface layer ID "w53" having the meaning of "a piece of furniture consisting of a smooth flat slab fixed on legs", as well.

Then, the clustering processing unit 133 of the learning device 200 updates clusters stored in the cluster storage unit 124 by using the associated label IDs. FIG. 13 is a diagram illustrating an example of the cluster storage unit after label assignment according to the second embodiment. As illustrated with the reference numeral 6001 of FIG. 13, the context IDs "c7", "c8", and "c104", which have been stored in association with the surface layer ID "w78" in FIG. 12, are stored in association with the label ID "m7_2". In a similar manner, as illustrated with the reference numeral 6002 of FIG. 13, the context IDs "c4", "c5", and "c42", which have been stored in association with the surface layer ID "w53" in FIG. 12, are stored in association with the label ID "m10_1". That is, in the cluster storage unit 124 after updating illustrated in FIG. 13, the number of context IDs stored in association with label IDs, that is, the number of input documents including words corresponding to the label IDs may be increased compared to that before updating.

Advantageous Effects

As described above, when documents including a first word are classified into a first cluster and a second cluster, the learning device according to the present embodiment assigns a first label to the first word included in the documents constituting the first cluster. Further, the learning device according to the present embodiment assigns a second label, which is different from the first label, to the first word included in the documents constituting the second cluster. The learning device according to the present embodiment assigns the first label to the second word when a cluster obtained through classification with the second word is similar to the first cluster, and assigns the second label to the second word when the cluster obtained through classification with the second word is similar to the second cluster. This enables increase in the number of input documents used for distributed learning, in the configuration in which words having the same surface layers are subdivided.

Third Embodiment

Though the configuration is described in which a common semantic label is associated with two words corresponding to clusters between which a distance is short in the above-described embodiments, embodiments are not limited to this configuration. For example, such configuration may be employed that common semantic labels are associated with synonyms stored in a synonym dictionary, for example, which is preliminarily stored, irrespective of a distance between clusters. Further, it may not be effective to increase the number of input documents used for distributed learning in the case where the sufficient number of input documents has already been secured or the case where two words are mutually inclusive.

Figure 14:
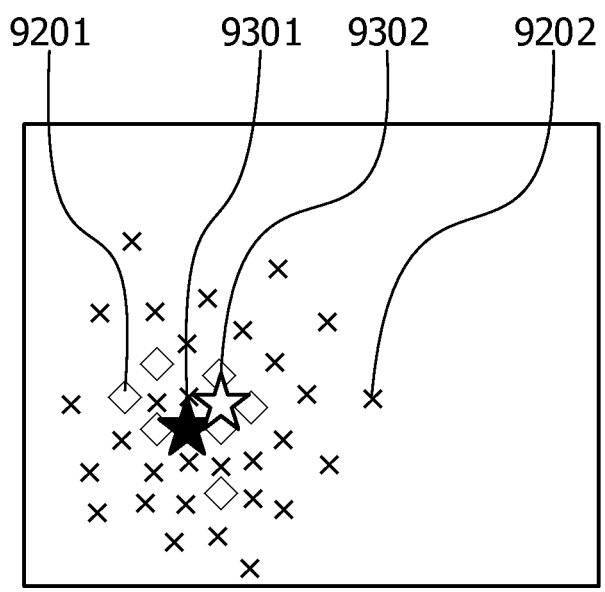
FIG. 14 is a diagram illustrating an example of a clustering result according to a third embodiment.

An example of the case where increasing the number of input documents used for distributed learning may not be effective will be described with reference to FIG. 14. FIG. 14 is a diagram illustrating an example of a clustering result according to the third embodiment. In FIG. 14, the symbol "0" denoted by the reference numeral 9201 denotes distribution of documents including the first word and the symbol "x" denoted by the reference numeral 9202 denotes distribution of documents including the second word.

In FIG. 14, a center of gravity 9301 of the distribution of documents including the first word and a center of gravity 9302 of the distribution of documents including the second word are close to each other. On the other hand, the documents including the second word are broadly distributed and encompass the distribution of documents including the first word. In the case where two words are in a higher-order concept and a lower-order concept, such as the case where the first word is "fruits" and the second word is "apple", for example, two distributions may be in an inclusion relation, as illustrated in FIG. 14. In this case, if a common semantic label is assigned to the first word and the second word so as to increase the number of input documents used for distributed learning, it may be interfered to grasp the relation between the higher-order concept and the lower-order concept of the first word and the second word.

Therefore, the configuration for determining whether or not to assign a common label to two words will be described in the present embodiment.

[Functional Block]

Figure 15:
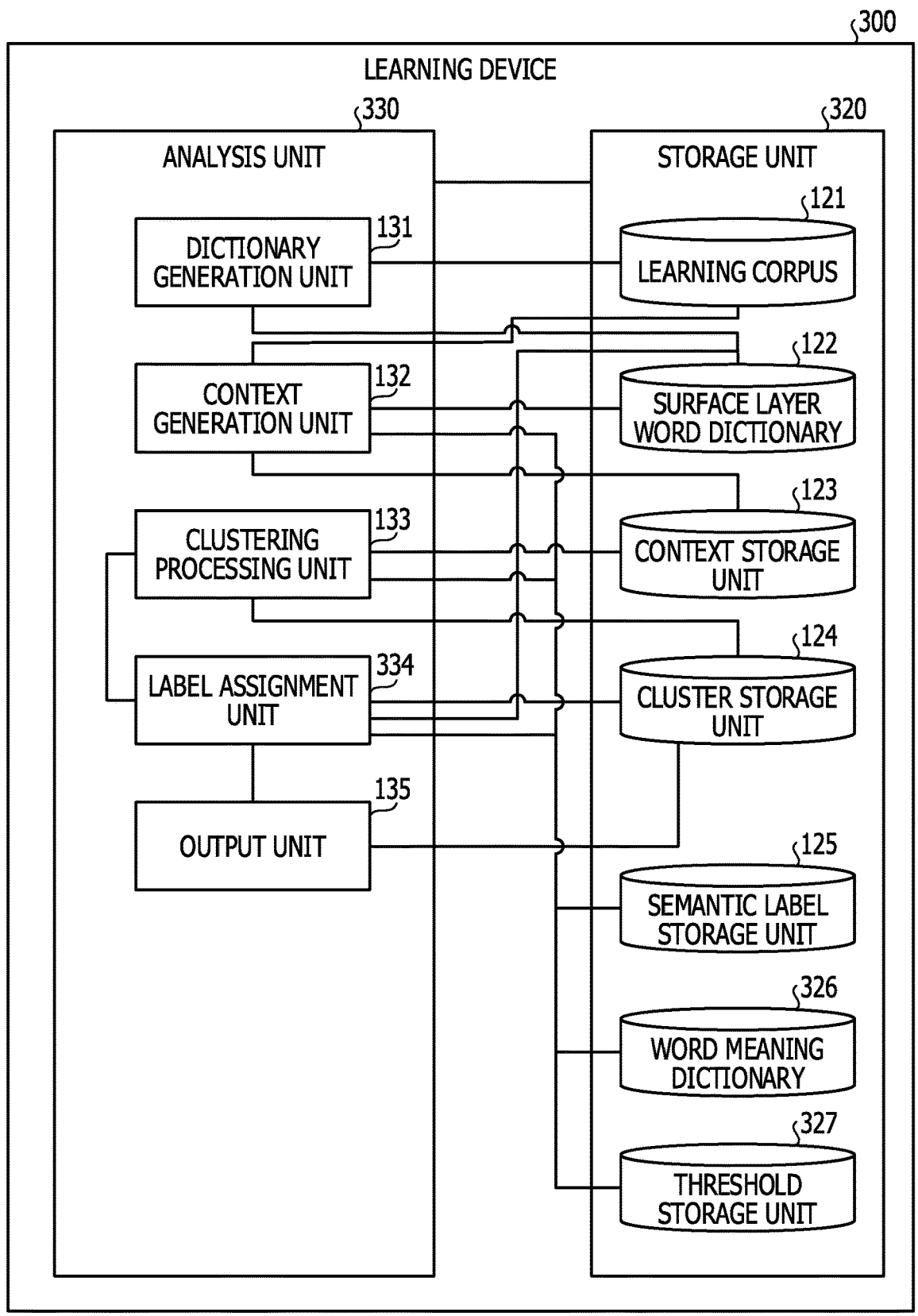
FIG. 15 is a diagram illustrating an example of a learning device according to the third embodiment.

An example of the learning device according to the present embodiment will be described with reference to FIG. 15. FIG. 15 is a diagram illustrating an example of the learning device according to the third embodiment. Here, in the following embodiment, the same parts as those illustrated in the drawings described above are denoted by the same reference numerals and redundant description will be omitted.

As illustrated in FIG. 15, a learning device 300 according to the present embodiment includes a storage unit 320 and an analysis unit 330. The storage unit 320 includes a word meaning dictionary 326 and a threshold value storage unit 327 in addition to the learning corpus 121, the surface layer word dictionary 122, the context storage unit 123, the cluster storage unit 124, and the semantic label storage unit 125.

The word meaning dictionary 326 stores a correspondence relation of words which are similar to each other. The word meaning dictionary 326 is a synonym dictionary, for example, but is not limited thereto. The word meaning dictionary 326 may have another form for storing a surface layer ID of a word and a meaning in an associating manner. FIG. 16 is a diagram illustrating an example of the word meaning dictionary according to the third embodiment. FIG. 16 illustrates an example of the word meaning dictionary 326 having a form of a synonym dictionary in which surface layer IDs of words having similar meanings are grouped. Here, information stored in the word meaning dictionary 326 is preliminarily inputted by an administrator of the learning device 300, who is not illustrated, for example, or acquired from an external computer via a communication unit, which is not illustrated.

As illustrated in FIG. 16, the word meaning dictionary 326 stores a plurality of surface layer IDs in association with a "label ID". The word meaning dictionary 326 illustrated in FIG. 16 stores such that both of the word of the surface layer ID "w14" and the word of the surface layer ID "w23" have the meaning of the label ID "m15", that is, the words are similar to each other, for example. In a similar manner, the word meaning dictionary 326 illustrated in FIG. 16 stores such that both of the word of the surface layer ID "w31" and the word of the surface layer ID "w42" have the meaning of the label ID "m21", that is, the words are similar to each other, for example.

Referring back to FIG. 15, the threshold value storage unit 327 stores a threshold value used in determination of whether or not to assign a common semantic label to words of a plurality of surface layer IDs. Information stored in the threshold value storage unit 327 is preliminarily inputted by an administrator of the learning device 300, who is not illustrated, for example. Here, illustration of the threshold value storage unit 327 is omitted.

The threshold value storage unit 327 according to the present embodiment stores a threshold value on a distance between centers of gravity of two clusters, which are stored in the storage unit 120 of the learning device 100 in the first embodiment, for example. In addition to the threshold value on a distance between centers of gravity of two clusters, the threshold value storage unit 327 according to the present embodiment may store other threshold values such as a threshold value on a difference in distribution of two clusters and a threshold value on the number of samples such as the number of documents included in a cluster.

The analysis unit 330 includes the dictionary generation unit 131, the context generation unit 132, the clustering processing unit 133, the label assignment unit 334, and the output unit 135. Here, the label assignment unit 334 is also an example of an electronic circuit included in a processor or an example of a process executed by the processor.

The label assignment unit 334 refers to the cluster storage unit 124 so as to assign a semantic label to each word used for classification to clusters as is the case with the label assignment unit 134 according to the first embodiment. In the present embodiment, when it is determined that a distance between centers of gravity of two clusters is smaller than a predetermined threshold value, the label assignment unit 334 further determines another condition unlike the label assignment unit 134 according to the first embodiment.

The label assignment unit 334 further determines whether or not a difference in distribution of two clusters, whose distance between centers of gravity is smaller than a predetermined threshold value, is smaller than a predetermined threshold value, for example. In the present embodiment, when the label assignment unit 334 determines that a difference in distribution of two clusters is equal to or larger than a predetermined threshold value, the label assignment unit 334 does not assign a common label to two words. When two words are in the inclusion relation as illustrated in FIG. 14, for example, the label assignment unit 334 does not assign a common label to the two words.

In addition, the label assignment unit 334 further determines whether or not the number of samples included in the two clusters, whose distance between centers of gravity is smaller than a predetermined threshold value, is smaller than a predetermined threshold value. In the present embodiment, when the label assignment unit 334 determines that the number of samples included in two clusters is equal to or larger than the predetermined threshold value, the label assignment unit 334 does not assign a common label to the two words. This is because it is possible to secure the sufficient number of input documents used for distributed learning in the case where the number of samples is already sufficient, for example.

Here, the label assignment unit 334 determines the total number of samples included in two clusters, for example, but the present disclosure is not limited to this. The label assignment unit 334 may determine the number of samples included in the cluster having the smaller number of samples.

Further, the label assignment unit 334 may refer to the word meaning dictionary 326 illustrated in FIG. 16 and determine whether or not a word having a meaning similar to that of a word of a specific surface layer ID is registered. When the label assignment unit 334 determines that a word having a similar meaning is registered in the word meaning dictionary 326, the label assignment unit 334 may assign a common semantic label to the two words irrespective of a distance between a cluster of the word of the specific surface layer ID and a cluster of the word having the similar meaning.

[Processing Flow]

Figure 17A:
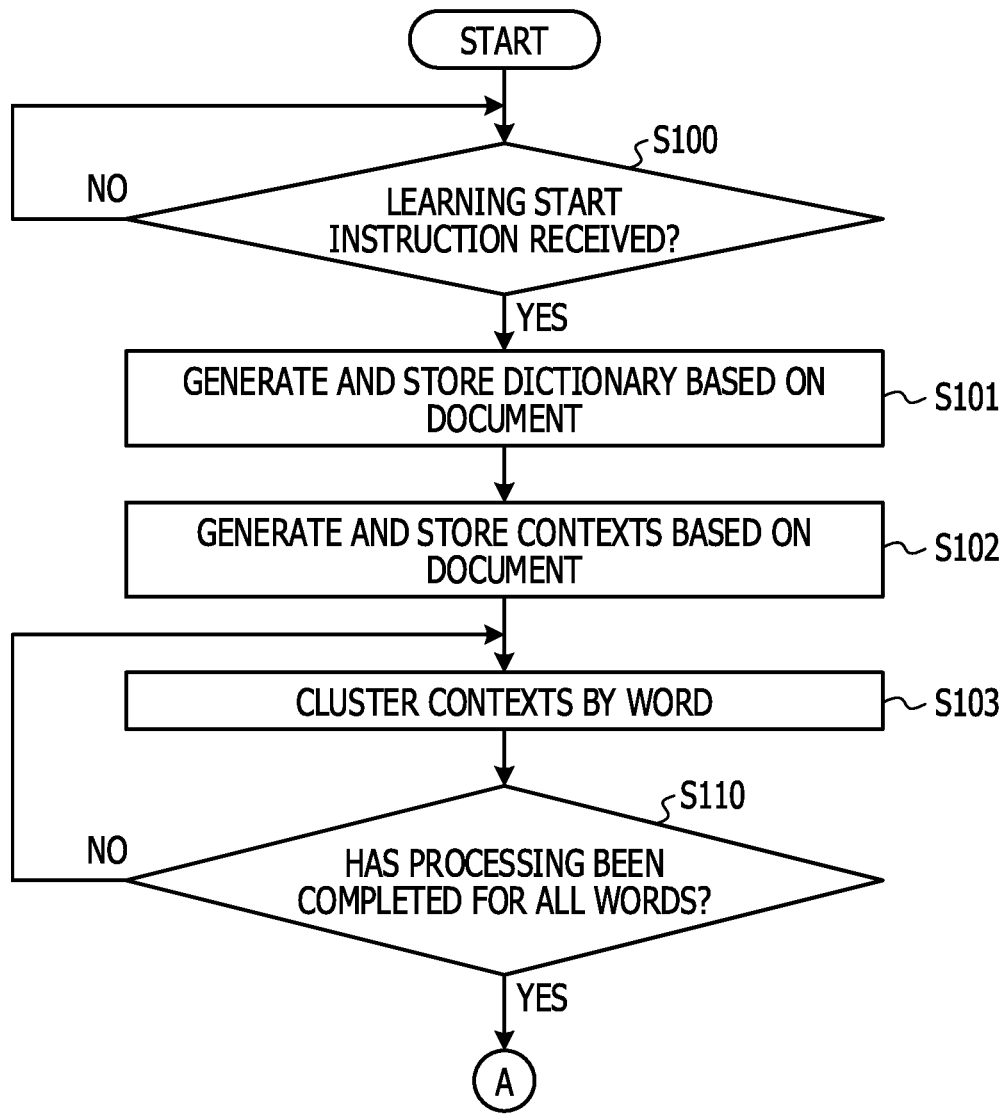
FIGS. 17A, 17B are flowcharts illustrating an example of learning processing according to the third embodiment.
Figure 17B:
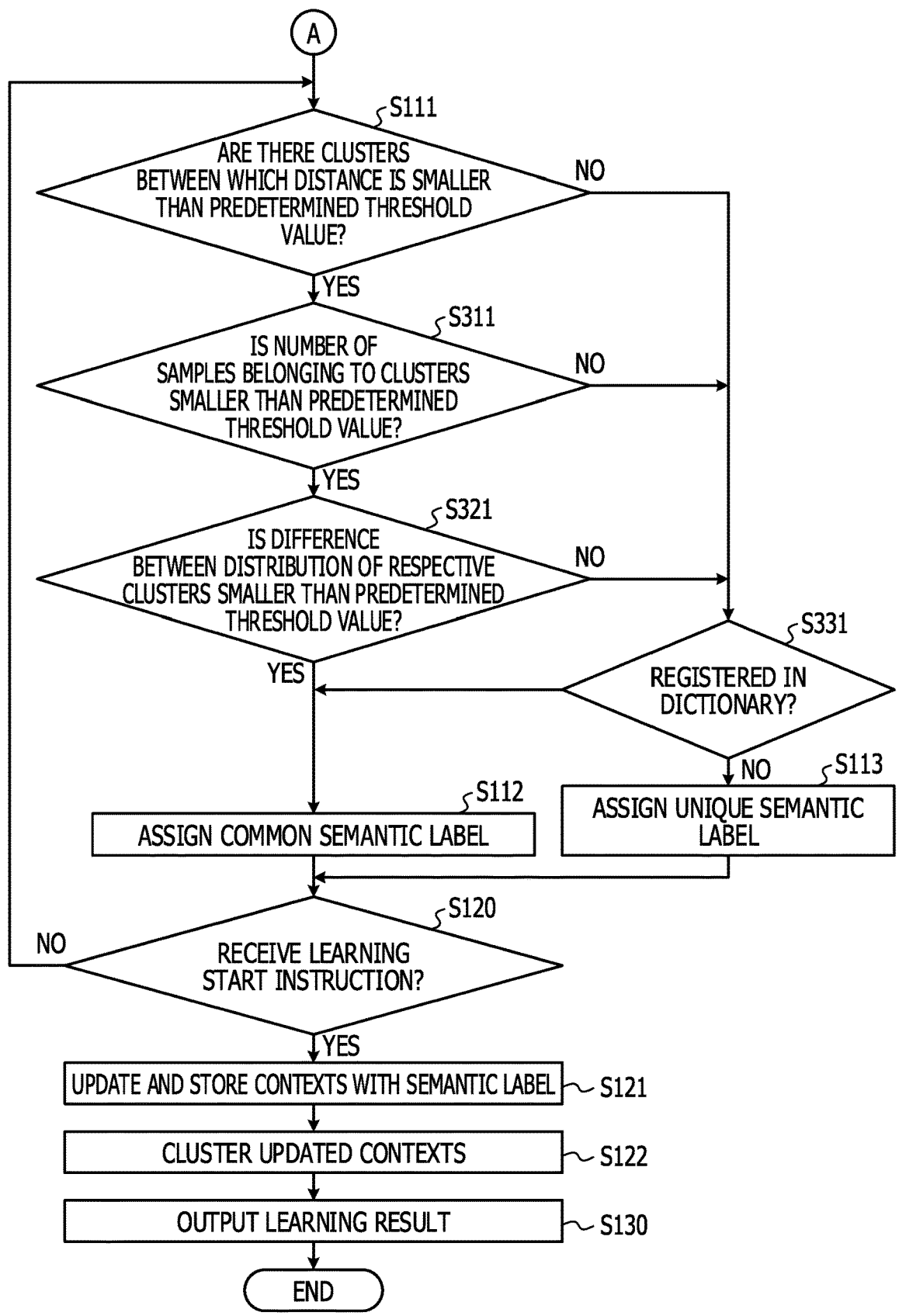

Learning processing performed by the learning device 300 according to the present embodiment will now be described with reference to FIGS. 17A and 17B. FIGS. 17A and 17B are flowcharts illustrating an example of the learning processing according to the third embodiment. In the following description, since the same reference characters as those of the steps illustrated in FIG. 11 represent the same steps, detailed description thereof will be omitted.

As illustrated in FIGS. 17A and 17B, the label assignment unit 334 of the learning device 300 determines whether or not there are generated clusters between which a distance is smaller than a predetermined threshold value (S111). When the label assignment unit 334 determines that there are no clusters between which a distance is smaller than the predetermined threshold value (S111: No), the label assignment unit 334 refers to the word meaning dictionary 326 so as to determine whether or not a word having a similar meaning to that of a word included in the cluster which is generated is registered (S331).

When the label assignment unit 334 determines that a word having a similar meaning is registered (S331: Yes), the label assignment unit 334 assigns a common semantic label to each word (S112) and the processing goes to S120. On the other hand, when the label assignment unit 334 determines that a word having a similar meaning is not registered (S331: No), the label assignment unit 334 assigns a unique semantic label to the word (S113) and the processing goes to S120.

Returning to S111, when the label assignment unit 334 determines that there are clusters between which a distance is smaller than the predetermined threshold value (S111: Yes), the label assignment unit 334 further determines whether or not the number of samples included in the two clusters is smaller than a predetermined threshold value (S311). When the label assignment unit 334 determines that the number of samples included in the two clusters is equal to or larger than the predetermined threshold value (S311: No), the processing goes to S331.

On the other hand, when the label assignment unit 334 determines that the number of samples included in the two clusters is smaller than the predetermined threshold value (S311: Yes), the label assignment unit 334 further determines whether or not a difference between distribution of the two clusters is smaller than a predetermined threshold value (S321). When the label assignment unit 334 determines that the difference between distribution of the two clusters is equal to or larger than the predetermined threshold value (S321: No), the processing goes to S331.

On the other hand, when the label assignment unit 334 determines that the difference between distribution of the two clusters is smaller than the predetermined threshold value (S321: Yes), the label assignment unit 334 assigns a common semantic label to each word used for classification to clusters (S112) and the processing goes to S120.

Advantageous Effects

As described above, when the learning device according to the present embodiment determines that the number of samples of a cluster obtained through classification with a first word, a cluster obtained through classification with a second word, or a combination thereof is equal to or larger than a threshold value, the learning device suppresses assignment of a common label. Further, when the learning device according to the present embodiment determines that a difference between density of samples of a cluster obtained through classification with a first word and density of samples of a cluster obtained through classification with a second word is equal to or larger than a threshold value, the learning device suppresses assignment of a common label. This enables suppression of excessive assignment of semantic labels.

Further, the learning device according to the present embodiment further includes the word meaning dictionary which stores meanings of words. When the learning device according to the present embodiment determines that the word meaning dictionary includes a description in which the first word and the second word have meanings similar to each other, the learning device determines that a cluster obtained through classification with the first word and a cluster obtained through classification with the second word are similar to each other. Accordingly, it is possible to appropriately associate two words having a similar relation without determining whether or not a plurality of clusters are similar to each other.

Fourth Embodiment

The embodiments of the present disclosure have been described thus far. The present disclosure may be embodied in various different modes other than the above-described embodiments. For example, part of the functional block of the learning device 100 may be mounted on an external computer. For example, the learning device 100 may have the configuration for accessing an external database via a communication unit, which is not illustrated, so as to acquire a learning corpus instead of having the learning corpus 121. Further, the learning device 100 may have the configuration for acquiring a surface layer word dictionary from an external database instead of generating the surface layer word dictionary 122.

Further, the configuration has been described in which a threshold value used in determination of whether or not to assign a common semantic label to words of a plurality of surface layer IDs is preliminarily stored in the above-described embodiments, but embodiments are not limited to these. For example, the learning device may have the configuration for calculating a threshold value and storing the threshold value in the threshold value storage unit 327.

An example of the learning device according to the present embodiment will be described. Here, in the following embodiment, the same parts as those illustrated in the drawings described above are denoted by the same reference numerals and redundant description will be omitted. Further, illustration of the learning device according to the present embodiment is omitted.

A learning device 400 according to the present embodiment includes a storage unit 420 and an analysis unit 430. The storage unit 420 includes the learning corpus 121, the surface layer word dictionary 122, the context storage unit 123, the cluster storage unit 124, the semantic label storage unit 125, the word meaning dictionary 326, and a threshold value storage unit 427.

The threshold value storage unit 427 according to the present embodiment stores a threshold value used in determination of whether or not to assign a common semantic label to words of a plurality of surface layer IDs as is the case with the threshold value storage unit 327. Information stored in the threshold value storage unit 427 is inputted by a threshold value calculation unit 436 which will be described later, for example. Here, illustration of the threshold value storage unit 427 is omitted.

The analysis unit 430 includes the threshold value calculation unit 436 in addition to the dictionary generation unit 131, the context generation unit 132, the clustering processing unit 133, the label assignment unit 134, and the output unit 135. Here, the threshold value calculation unit 436 is also an example of an electronic circuit included in a processor or an example of a process executed by the processor.

The threshold value calculation unit 436 specifies two similar words, calculates a threshold value based on a relation between clusters obtained through classification with respective words, and stores the threshold value in the threshold value storage unit 427. The threshold value calculation unit 436 calculates a distance between centers of gravity of clusters and multiplies the calculated distance by a predetermined value so as to calculate a threshold value on the distance between the centers of gravity of the clusters, for example. In a similar manner, the threshold value calculation unit 436 calculates a difference in distribution of clusters and multiplies the calculated difference by a predetermined value so as to calculate a threshold value on the difference in the distribution of the clusters, for example.

Further, the threshold value calculation unit 436 calculates an average value, a median, or the like of the number of documents included in all clusters and multiplies the calculated average value or median by a predetermined value so as to calculate a threshold value on the number of samples included in the clusters.

Here, the configuration in which the threshold value calculation unit 436 calculates a threshold value is an example and another value such as the maximum value, the minimum value, an average value, and a median of a distance between centers of gravity of clusters may be used.

Figure 18:
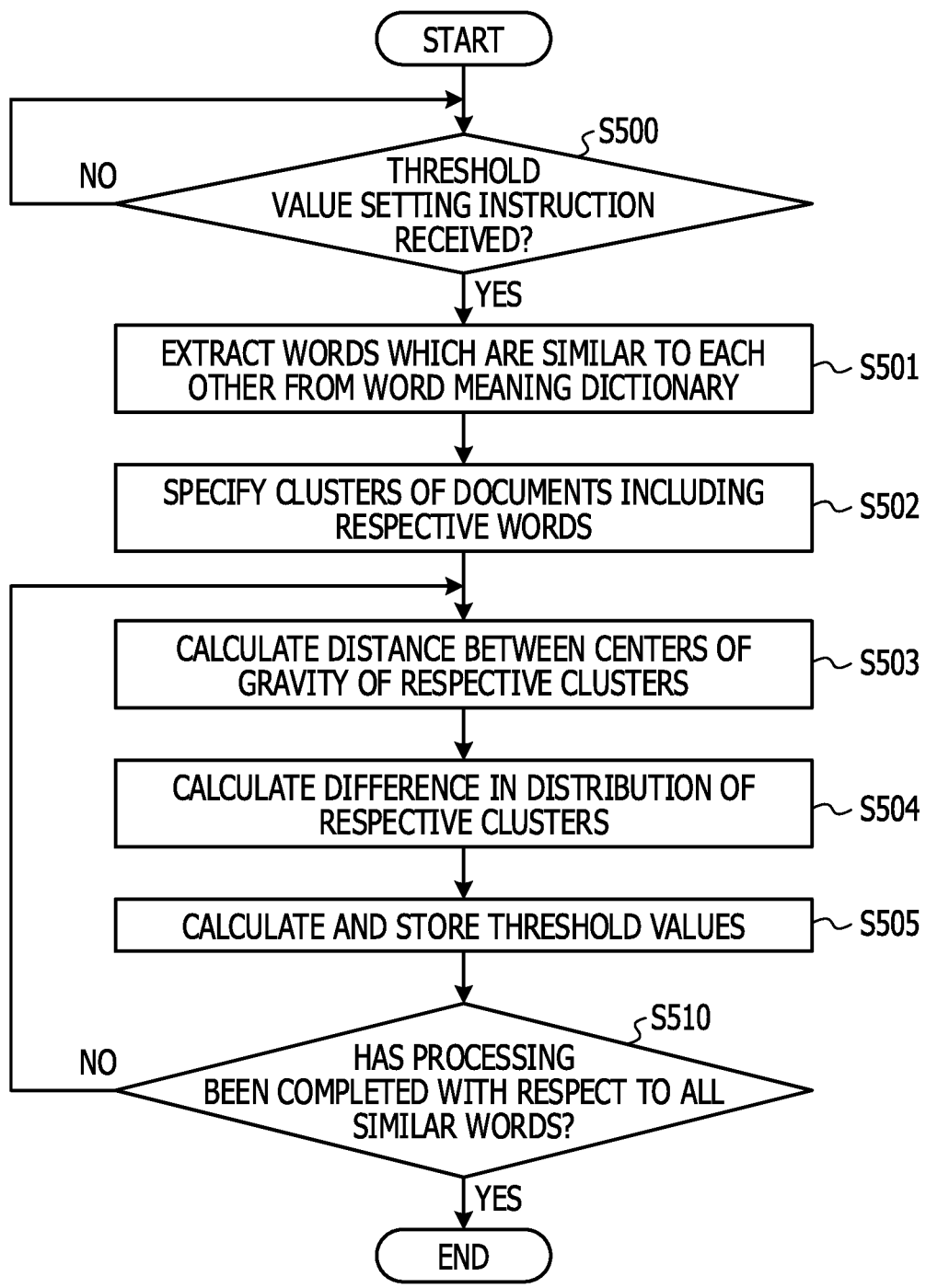
FIG. 18 is a flowchart illustrating an example of threshold value calculation processing according to a fourth embodiment.

Threshold value calculation processing performed by the learning device 400 according to the present embodiment will be described with reference to FIG. 18. FIG. 18 is a flowchart illustrating an example of the threshold value calculation processing according to the fourth embodiment. As illustrated in FIG. 18, the threshold value calculation unit 436 of the learning device 400 stands by (S500: No) until receiving a threshold value setting instruction from an administrator, who is not illustrated, through an operation unit, which is not illustrated, for example. When the threshold value calculation unit 436 determines that the threshold value calculation unit 436 has received the threshold value setting instruction (S500: Yes), the threshold value calculation unit 436 refers to the word meaning dictionary 326 so as to extract words which are similar to each other (S501).

Then, the threshold value calculation unit 436 specifies clusters of documents including respective extracted words (S502) and calculates a distance between centers of gravity of the respective clusters (S503). Further, the threshold value calculation unit 436 calculates a difference in distribution of the respective clusters, as well (S504). Then, the threshold value calculation unit 436 multiplies the calculated distance between centers of gravity and the calculated difference in distribution by predetermined values so as to calculate threshold values and store the threshold values in the threshold value storage unit 427 (S505).

Then, the threshold value calculation unit 436 returns to S503 and repeats the processing until completing the processing with respect to all similar words (S510: No). When the processing is completed with respect to all similar words (S510: Yes), the output unit 135 ends the threshold value calculation processing.

As described above, the learning device according to the present embodiment calculates a threshold value by using a distance between centers of gravity of clusters, which are obtained through classification with words which have meanings similar to each other, or a difference in distribution of the clusters. This enables setting of a threshold value conforming to actual conditions of clusters obtained through classification with words which are similar to each other.

The configuration has been described in which the learning device according to the embodiments preliminarily stores a threshold value, which is used for determining whether or not two clusters are similar to each other, in the storage unit 120, but embodiments are not limited to this configuration. For example, the learning device according to the embodiments may calculate a first threshold value by using a distance between centers of gravity of clusters obtained through classification with words which have meanings similar to each other or may calculate a second threshold value by using a difference in distribution of the clusters. Actual calculation of a threshold value based on similarity of clusters between words having similar meanings enables determination of whether or not the clusters are similar to each other to approximate an actual condition.

Further, even when it is determined that a plurality of clusters are similar to each other, there is the case where a common label does not have to be assigned to words used for classification to clusters, such as the case where the sufficient number of input documents constituting each cluster is secured. Therefore, when the learning device determines that the number of samples of a cluster obtained through classification with the first word, a cluster obtained through classification with the second word, or a combination thereof is equal to or larger than a threshold value, the learning device may suppress assignment of a label, which is common to that of the first word, to the second word. Further, when the learning device determines that a difference between density of samples of a cluster obtained through classification with the first word and density of samples of a cluster obtained through classification with the second word is equal to or larger than a threshold value, the learning device may suppress assignment of a label, which is common to that of the first word, to the second word. This enables suppression of unwanted label assignment.

A context in the above embodiments is expressed by a vector in which a word which appears in a document is denoted by "1" and a word which is desired to be estimated or does not appear in the document is denoted by "0", but embodiments are not limited to this. For example, a value of a context may be set to the number of times at which a word appears in a document. In this case, each term of a context may have not only a value "0" or "1" but also a value 2 or larger.

[System]

In addition, among all the processing described in the above embodiments, all or part of the processing described as being automatically performed may be performed manually. Alternatively, all or part of the processing described as being manually performed may be automatically performed by a known method. In addition, the processing procedures, control procedures, specific names, and information including various data and parameters illustrated in the above description or in the drawings may be changed arbitrarily unless otherwise specified.

In addition, each component of each illustrated device is functionally conceptual, and each device does not have to be physically configured as illustrated in the drawings. That is, specific forms of distribution and integration of the devices are not limited to those illustrated. That is, all or part of the devices may be configured by being functionally or physically dispersed/integrated in arbitrary units in accordance with various loads and usage situations. Furthermore, all or arbitrary part of processing functions performed in respective devices may be realized by a CPU or a program analyzed and executed by the CPU, or may be realized as hardware by wired logic.

[Hardware Configuration]

Figure 19:
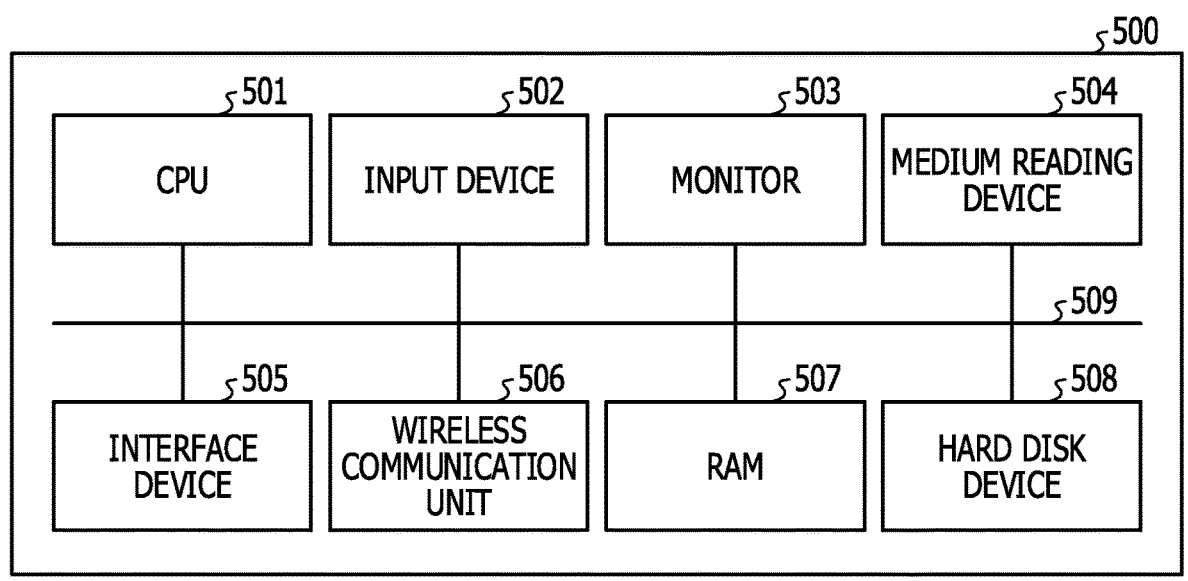
FIG. 19 is a diagram illustrating an example of the hardware configuration of a computer.

FIG. 19 is a diagram illustrating an example of the hardware configuration of a computer. As illustrated in FIG. 19, a computer 500 includes a CPU 501 executing various arithmetic processing, an input device 502 receiving data input from a user, and a monitor 503. The computer 500 further includes a medium reading device 504 reading a program or the like from a storage medium, an interface device 505 for connecting with other devices, and a radio communication device 506 for connecting with other devices by radio. The computer 500 furthermore includes a random access memory (RAM) 507 for temporarily storing various information and a hard disk device 508. The devices 501 to 508 are mutually connected by a bus 509.

In the hard disk device 508, analysis programs having a similar function to that of the analysis unit 130 illustrated in FIG. 1 are stored. Various data for realizing the analysis programs are further stored in the hard disk device 508. The various data include data in the storage unit 120 illustrated in FIG. 1.

The CPU 501 reads various programs stored in the hard disk device 508 and develops and executes the programs on the RAM 507 so as to perform various processing. These programs enable the computer 500 to function as various functional units illustrated in FIG. 1.

Here, the above-mentioned analysis programs do not have to be stored in the hard disk device 508. The computer 500 may read the programs stored in a storage medium, which is readable by the computer 500, so as to execute the programs, for example. The storage medium which is readable by the computer 500 is a portable recording medium such as a CD-ROM, a DVD disk, and a universal serial bus (USB) memory, a semiconductor memory such as a flash memory, a hard disk drive, or the like, for example. Further, these programs may be preliminarily stored in a device connected to a public line, the Internet, a local area network (LAN), or the like, and the computer 500 may read and execute these programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A learning device comprising:
a memory; and
a processor coupled to the memory and the processor configured to execute a process including,
acquiring a plurality of documents,
generating, for each of a first plurality of words included in the plurality of documents, first pieces of information respectively corresponding to the plurality of documents and indicating whether a relevant word and each of the first plurality of words other than the relevant word co-occur in each of the plurality of documents,
clustering the first pieces of information with respect to each of the first plurality of words,
assigning common labels to sets of first and second words, respectively, each common label being assigned to a first word included in first documents among the plurality of documents and a second word included in second documents among the plurality of documents when a first cluster and a second cluster resemble each other, the first cluster being obtained by clustering the first pieces of information generated for the first word and corresponding to the first documents, the second cluster being obtained by clustering the first pieces of information generated for the second word and corresponding to the second documents,
suppressing, even in a case where the first cluster and the second cluster resemble each other, assignment of the common label to the first word and the second word when a number of samples of the first cluster or the second cluster is not less than a first threshold value, or when a first difference between a first density of samples of the first cluster and a second density of samples of the second cluster is not less than a second threshold value,
assigning unique labels to remaining words, respectively, in the plurality of documents, the remaining words not being assigned with the common labels,
generating, for each of the common labels and the unique labels, second pieces of information respectively corresponding to the plurality of documents and indicating whether a third word corresponding to a relevant label and a fourth word corresponding to each of the common labels and the unique labels other than the relevant label co-occur in each of the plurality of documents, and
clustering the second pieces of information with respect to each of the common labels and the unique labels.

2. The learning device according to claim 1, wherein a determination is made that the first cluster and the second cluster resemble each other when a first distance between a first center of gravity of the first cluster and a second center of gravity of the second cluster is less than a third threshold value, or when a second difference between a first distribution of the first cluster and a second distribution of the second cluster is less than a fourth threshold value.

3. The learning device according to claim 2, wherein the third threshold value is determined based on a second distance between centers of gravity of a third cluster corresponding to third documents among the plurality of documents and a fourth cluster corresponding to fourth documents among the plurality of documents, each of the third documents including a third word, each of the fourth documents including a fourth word, the third word and the fourth word having meanings that resemble each other, or the fourth threshold value is determined based on a third difference in distribution of the third cluster and the fourth cluster.

4. The learning device according to claim 1, the process further including, referring to a word meaning dictionary that stores a meaning of a word, and assigning another common label to a third word and a fourth word among the first plurality of words when it is detected that the third word and the fourth word are synonyms.

5. The learning device according to claim 1, wherein assigning the common label is performed on an assumption that a plurality of words assigned with the common label have a similar meaning.

6. The learning device according to claim 1, the process further including assigning a first label to the first word included in third documents among the plurality of documents, the first label being different from the common label assigned to the first word included in the first documents, the third documents corresponding to a third cluster different from the first cluster, the third cluster being obtained by clustering the first pieces of information generated for the first word.

7. A learning method comprising:
acquiring, by a computer, a plurality of documents;
generating, for each of a first plurality of words included in the plurality of documents, first pieces of information respectively corresponding to the plurality of documents and indicating whether a relevant word and each of the first plurality of words other than the relevant word co-occur in each of the plurality of documents;
clustering first pieces of information with respect to each of the first plurality of words;
assigning common labels to sets of first and second words, respectively, each common label being assigned to a first word, included in first documents among the plurality of documents, and a second word, included in second documents among the plurality of documents, when a first cluster and a second cluster resemble each other, the first cluster being obtained by clustering the first pieces of information generated for the first word and corresponding to the first documents, the second cluster being obtained by clustering the first pieces of information generated for the second word and corresponding to the second documents;
suppressing, even in a case where the first cluster and the second cluster resemble each other, assignment of the common label to the first word and the second word when a number of samples of the first cluster or the second cluster is not less than a first threshold value, or when a first difference between a first density of samples of the first cluster and a second density of samples of the second cluster is not less than a second threshold value;
assigning unique labels to remaining words, respectively, in the plurality of documents, the remaining words not being assigned with the common labels;
generating, for each of the common labels and the unique labels, second pieces of information respectively corresponding to the plurality of documents and indicating whether a word corresponding to a relevant label and a word corresponding to each of the common labels and the unique labels other than the relevant label co-occur in each of the plurality of documents; and
clustering the second pieces of information with respect to each of the common labels and the unique labels.

8. The learning method according to claim 7, wherein it is determined that the first cluster and the second cluster resemble each other when a first distance between a first center of gravity of the first cluster and a second center of gravity of the second cluster is less than a third threshold value, or when a second difference between a first distribution of the first cluster and a second distribution of the second cluster is less than a fourth threshold value.

9. The learning method according to claim 8, wherein the third threshold value is determined based on a second distance between centers of gravity of a third cluster corresponding to third documents among the plurality of documents and a fourth cluster corresponding to fourth documents among the plurality of documents, each of the third documents including a third word, each of the fourth documents including a fourth word, the third word and the fourth word having meanings that resemble each other, or the fourth threshold value is determined based on a third difference in distribution of the third cluster and the fourth cluster.

10. The learning method according to claim 7, further comprising:
referring to a word meaning dictionary that stores a meaning of a word; and
assigning another common label to a third word and a fourth word among the first plurality of words when it is detected that the third word and the fourth word are synonyms.

11. The learning method according to claim 7, wherein assigning the common label is performed on an assumption that a plurality of words assigned with the common label have a similar meaning.

12. The learning method according to claim 7, further comprising assigning a first label to the first word included in third documents among the plurality of documents, the first label being different from the common label assigned to the first word included in the first documents, the third documents corresponding to a third cluster different from the first cluster, the third cluster being obtained by clustering the first pieces of information generated for the first word.

13. A non-transitory computer-readable medium storing a learning program that causes a computer to execute a process comprising:
acquiring a plurality of documents;
generating, for each of a first plurality of words included in the plurality of documents, first pieces of information respectively corresponding to the plurality of documents and indicating whether a relevant word and each of the first plurality of words other than the relevant word co-occur in each of the plurality of documents;
clustering first pieces of information with respect to each of the first plurality of words;
assigning common labels to sets of first and second words, respectively, each common label being assigned to a first word included in first documents among the plurality of documents and a second word, included in first documents among the plurality of documents, when a first cluster and a second cluster resemble each other, the first cluster being obtained by clustering the first pieces of information generated for the first word and corresponding to the first documents, the second cluster being obtained by clustering the first pieces of information generated for the second word and corresponding to the second documents;
suppressing, even in a case where the first cluster and the second cluster resemble each other, assignment of the common label to the first word and the second word when a number of samples of the first cluster or the second cluster is not less than a first threshold value, or when a first difference between a first density of samples of the first cluster and a second density of samples of the second cluster is not less than a second threshold value;

assigning unique labels to remaining words, respectively, in the plurality of documents, the remaining words not assigned with any common label;

generating, for each of the common labels and the unique labels, second pieces of information respectively corresponding to the plurality of documents and indicating whether a word corresponding to a relevant label and a word corresponding to each of the common labels and the unique labels other than the relevant label co-occur in each of the plurality of documents; and clustering the second pieces of information with respect to each of the common labels and the unique labels.

* * * * *